Figure 2:
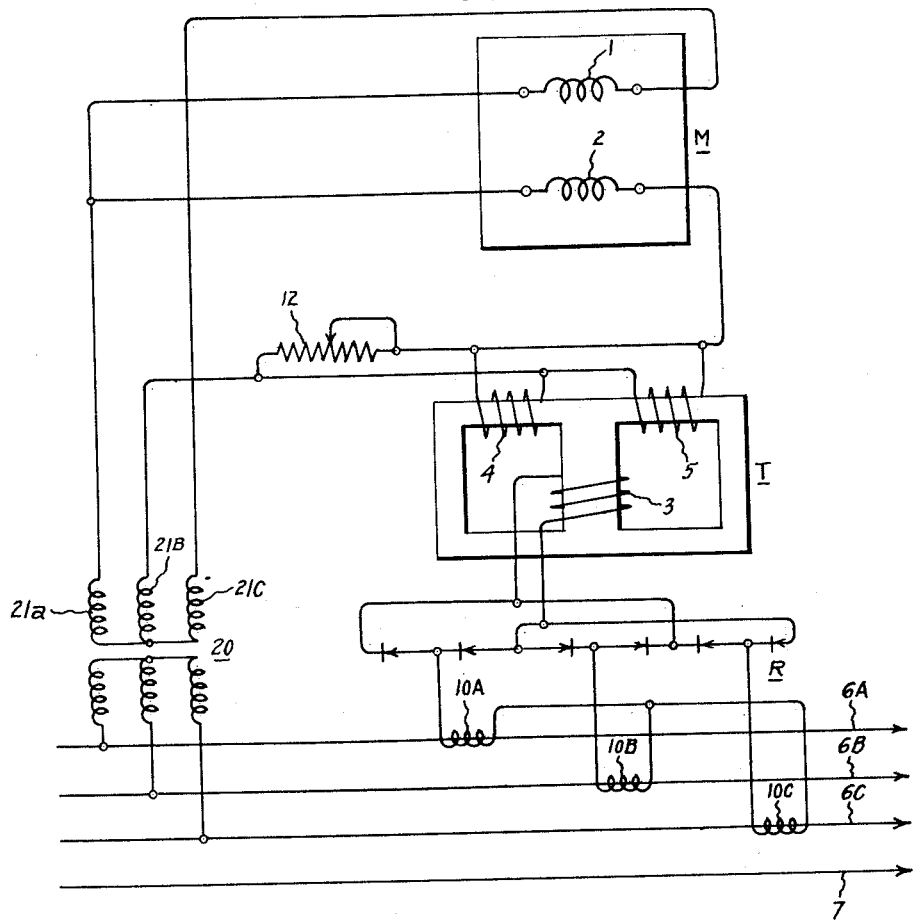

Oct. 14, 1952  P. BAXTER  2,614,139
VOLT-AMPERE METER
Filed July 15, 1950  3 Sheets-Sheet 1
Fig.1.
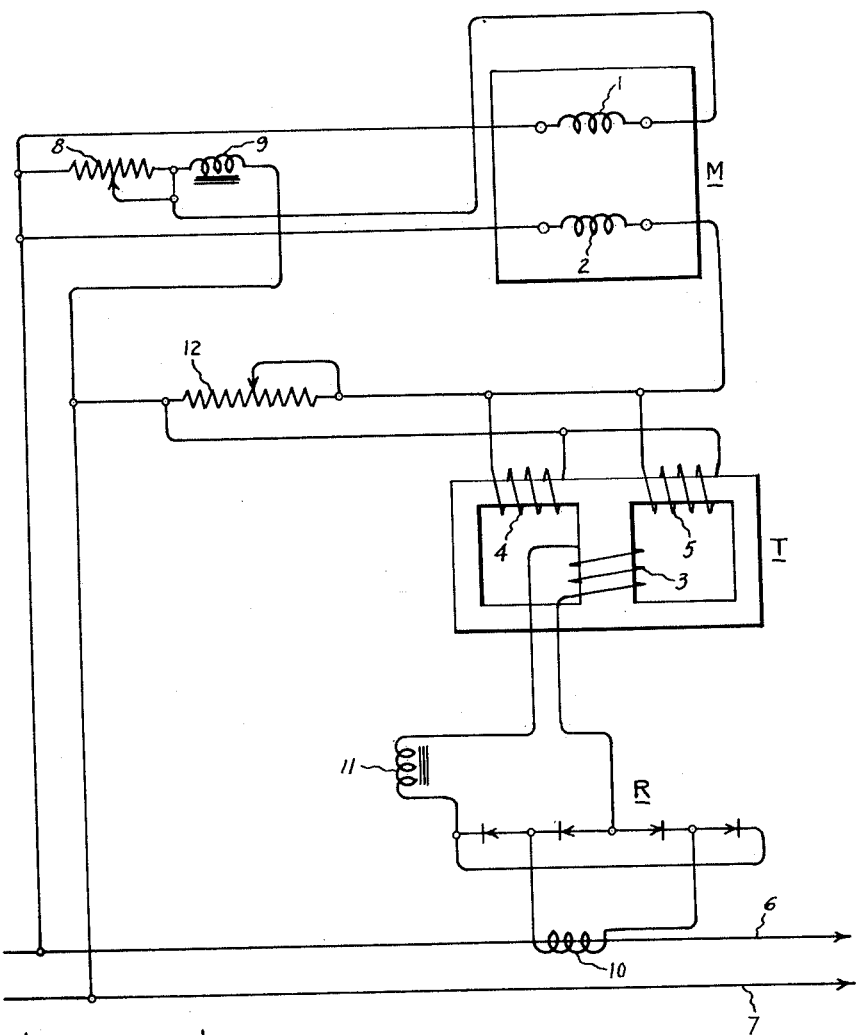
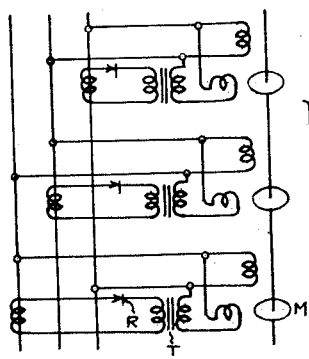
Fig.1a.
Inventor:
Philip Baxter,
by Russell A. Warner
His Attorney.

Oct. 14, 1952 P. BAXTER 2,614,139
VOLT-AMPERE METER
Filed July 15, 1950 3 Sheets-Sheet 2

Inventor:
Philip Baxter,
by Russell A. Warner
His Attorney.

Oct. 14, 1952 P. BAXTER 2,614,139
VOLT-AMPERE METER
Filed July 15, 1950 3 Sheets-Sheet 3
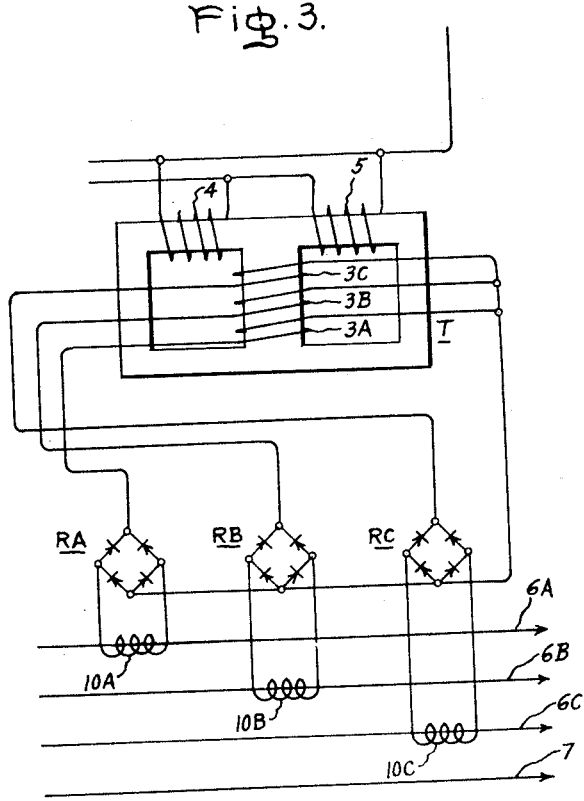

Patented Oct. 14, 1952

2,614,139

UNITED STATES PATENT OFFICE 2,614,139

VOLT-AMPERE METER

Philip Baxter, Davyhulme, Manchester, England, assignor to General Electric Company, a corporation of New York Application July 15, 1950, Serial No. 173,991
In Great Britain August 10, 1949

4 Claims. (Cl. 171—95)

This invention relates to alternating current electrical measuring circuit arrangements for metering, indicating or control purposes, and particularly to such circuit arrangements for providing operation responsive to volt-amperes or volt-ampere-hours.

According to the present invention an electric circuit arrangement for responding to volt-amperes including volt ampere-hours in an alternating current main circuit, that is to say any circuit to which response is required, comprises a wattmeter of either the indicating or integrating type, the current and voltage coils of which are both connected for energization either in accordance with the voltage or the current of said circuit, and one of which coils includes in circuit therewith a saturable reactance device or transductor connected for control of the effective impedance thereof in accordance with the current or voltage of the main circuit respectively. By this means the transductor acts as a variable reactance device to provide an energisation of the one element of the meter in accordance with the current or voltage, as the case may be, so that the currents in said elements will be always in phase with one another, or of constant or substantially constant phase relation, irrespectively of the phase of the current and voltage of the main circuit.

A transductor comprises one or more saturable magnetic circuits having a winding or windings included in an alternating current circuit and provision for direct current control excitation for controlling the output of the transductor, that is to say the value of the alternating current flowing in said winding or windings. The magnetic circuit may be provided with various additional windings or direct current excitation components whereby desired operating characteristics are obtained. For example, a positive feedback winding is commonly employed producing additional control ampere turns, derived through a rectifier from the output current, acting in the direction to assist the main control current and thereby improve the sensitivity of the device.

The transductor output winding may conveniently be included in series between the main circuit and the associated winding of the meter; it has been found that a linear or substantially linear relation may then readily be obtained between the current supplied by the transductor to the meter and the current supplied to the input windings of the transductor, and, further-more, that the power factor of said output current is substantially constant relatively to the voltage in the circuit to which response is required. It will be understood, however, that the invention is not limited to arrangements in which the transductor output winding is connected in series with the winding of the meter.

In carrying out the invention, the watt meter may comprise a single element for single phase operation or two or more elements for polyphase operation in accordance with well known principles, in combination with one or more transductors as may be necessary or convenient. The coils of the watt meter and the transductor, or a plurality of transductors, may in general be arranged so that the energisation of the meter coils corresponds with any of the well known meter techniques so as to produce the required operation in response to the voltage and current in a desired single or polyphase circuit or circuits or in two or more main circuits.

The invention includes as subsidiary features thereof arrangements as described.

According to another feature of the invention, for obtaining response of a single element meter to the sum of the volt-amperes in the phases of a balanced-voltage polyphase circuit or in separate alternating current circuits of common voltage, the "current" coil of the meter is connected for energisation under control of the saturable reactance device or transductor, and the latter is essentially provided with direct current control excitation comprising components derived after rectification from the alternating currents in the separate phases or the separate alternating current circuits. With this arrangement, since the transductor produces a component of output current corresponding with each component of direct current control excitation, the total current supplied to the coil in question of the meter will comprise the sum of the components corresponding respectively with the several phase or circuit alternating currents so that the meter will respond to the summated volt-amperes or volt-ampere-hours of said phases or circuits.

In some cases it may be desirable to modify the phase relationship between the current and voltage coils, either by suitable choice of the phase conductors with which the current coils are connected in relation to those with which the associated voltage coils are connected, or by ohmic resistance or other power factor controlling devices in circuit with the voltage or current coil, or both said coils. The watt meter or watt-hour meter may therefore be operated either at unity power factor or at other constant power factor as may be found desirable in particular applications.

Figure 2A:
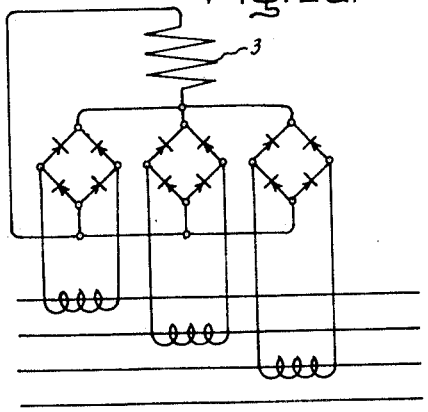

Reference will now be made by way of example to the accompanying drawings, in which:

Figs. 1 and 2 are single and polyphase electrical circuit diagrams illustrating embodiments according to the invention, Figs. 2a and 3 are fragmentary electrical circuit diagrams corresponding with part of Fig. 2 and showing modifications thereof, and Fig. 1a represents the invention applied to a multiple element polyphase meter.

Similar parts are designated by like reference numerals in the several figures.

An alternating current watt-meter or watt-hour meter is shown at M and may be of any suitable type; conveniently said meter is of the induction type. The voltage and current coils of the meter are shown respectively at 1 and 2. A transductor is shown at T having a direct current control winding 3. The transductor is shown by way of example as being of the type comprising a three-limbed magnetic core, on the centre limb of which the winding 3 is wound and with an output winding comprising two parts 4 and 5 linking with the flux passing through the outer limbs of the core respectively, said winding parts being connected in parallel with one another in the arrangement shown.

The arrangement shown in Fig. 1 will be described with reference to a single-phase circuit comprising line conductors 6 and 7. The voltage coil 1 of the meter is connected across a variable resistance 8 which is connected in series with a choke coil 9 across the conductors 6 and 7. By this means the coil 1 is energised in accordance with the voltage between the conductors 6 and 7 through the impedance network comprised by the resistance 8 and choke coil 9 whereby the phase of the current in the coil 1 may be selected for optimum results as will hereinafter appear. The current coil 2 of the meter is connected in series with the output winding 4, 5 of the transductor across the conductors 6 and 7, whilst the control winding 3 of the transductor is connected through a rectifier R with the secondary winding of a current transformer 10, the primary winding of which is included in the conductor 6. Preferably a choke coil 11 is included in series with the winding 3 for smoothing the rectified current supplied to said winding from the current transformer. The rectifier is conveniently of the full-wave dry-plate type. A variable resistor 12 may be connected in parallel with the output winding of the transductor for a purpose hereinafter to be described.

In the operation of the arrangement shown in Fig. 1, the voltage coil 1 is energised in accordance with the voltage between the conductors 6 and 7, whilst the current coil 2 is supplied from said conductors with a current the magnitude of which is controlled by the transductor in accordance with the current in the conductor 6. The currents in the coils 1 and 2 have a predetermined phase relationship which is unaffected by the power factor of the main circuit 6, 7 since the current for the coil 2 is also derived from the same source as the voltage in the coil 1, that is to say from the voltage between the main conductors. These currents are proportional respectively to the voltage and current of the main circuit so that the meter M will respond to the volt-amperes or volt-ampere-hours of the main circuit.

The network 8, 9 enables the meter M to be operated either at unity power factor or at other constant power factor as may be found desirable for particular applications.

The resistor 12 is employed to correct slight errors which in some cases may otherwise appear at low loads.

For response to an unbalanced-voltage three-phase system of the three or four wire type, three transductors may be associated with the three phase conductors each as described with reference to Fig. 1, with the three transductors supplying current coils of a three-element meter the voltage coils of which are all energised as described with reference to the coil 1 in Fig. 1. Such a combination is indicated schematically in Fig. 1a. In the case of a three wire system, the voltage coils may be energised from the appropriate line conductor and the neutral point where the latter is available such as from a voltage transformer. It will be understood that where desired voltage transformers may be included between the coil 1 or the coil 2 and the main circuit.

In modifications of the arrangement shown in Fig. 1, the current coil of the meter is supplied directly from a current transformer whilst the voltage coil is also supplied from said current transformer through a transductor, the control winding of the transductor then being energised through a rectifier in accordance with the line voltage, such as directly or from a potential transformer. It is contemplated that arrangements of this kind will be more particularly applicable for providing response to a limited range of current, such as required for control purposes for example, that is to say in cases where the meter is employed as a relay device. Corresponding modification may be made in the case of polyphase systems.

Fig. 2 illustrates an arrangement for response to volt-amperes or volt-ampere-hours on a balanced-voltage three or four wire system. The three phase conductors are shown at 6A, 6B and 6C, and the neutral conductor at 7 in the case of a four-wire system. The arrangement includes a voltage transformer 20 having a primary winding connected in star with the phase conductors 6A, 6B and 6C, and a star-connected secondary winding comprising phases 21A, 21B and 21C. The meter is of the single element type with the voltage coil 1 thereof connected for energization from the secondary windings 21A and 21C, whilst the current coil 2 is connected, in series with the output windings of the transductor, for energization from the secondary windings 21A and 21B. The rectifier R is of the three-phase type and the control winding 3 of the transductor is energised through said rectifier from the secondary windings of three current transformers 10A, 10B and 10C.

By this means the control current of the transductor is proportional to the sum of the separate phase currents of the main circuit so that the current supplied to the coil 2 of the meter is also proportional to said sum and the meter will therefore operate in accordance with the sum of the volt-amperes or volt-ampere-hours of the three phases.

Although in Fig. 2 a particular phase relationship for the currents in the voltage and current coils of the meter is indicated, it will be understood that the circuit connections of said windings with the phase conductors 6A, 6B and 6C may be modified and different phase relationships between said currents be found to be desirable in particular applications of the invention.

In a modification of the arrangement of Fig. 2, the three secondary windings of the current transformer may be connected in parallel with one another through three rectifiers respectively with the winding 3 so that the latter is again energised in accordance with the sum of the separate phase currents as indicated in Fig. 2a.

Fig. 3 illustrates a further modification in which the transductor is provided with three separate control windings 3A, 3B and 3C connected respectively through rectifiers RA, RB and RC with the three current transformers 10A, 10B and 10C respectively. In this case again the resultant control excitation is proportional to the sum of the several phase currents.

It will be understood that the arrangements described with reference to the drawings are given by way of example and that in carrying out the invention the energisation of the meter coils of a single or multi element meter may be arranged to correspond with any of the well known meter techniques so as to produce the required operation in response to the voltage(s) and current(s) in a desired circuit or in desired circuits which may correspond with the phases of a polyphase system or may be single or polyphase circuits separate from one another.

It will be understood that similar arrangements to those above indicated may be employed for circuits comprising a number of phases other than three and are also applicable for use with any desired number of separate circuits.

It will be understood that the form of transductor shown is given by way of example only and that in carrying out the invention the transductor or transductors may be of any suitable form as is well known in the art.

Blocking or filtering arrangements (not shown) may be included in circuit with the transductor and corresponding coil of the meter or meters for appropriately controlling the harmonic and direct current components which may otherwise be present in the current supplied to the meter.

It will be seen that with the arrangement according to the invention the watt meter or watt hour meter is operated at a value of power factor which is unaffected by the power factor of the main circuit load, since the currents for both coils of the meter are taken from the same source or from sources having predetermined phase relationship to one another irrespectively of that between the current and voltage of the circuit to which response is required.

In the claims the expression volt amperes is intended to include volt ampere hours and the expression wattmeter is intended to refer to a watt responsive meter of either the indicating or integrating type since the invention is equally applicable to both forms of measurement.

What I claim as new and desire to secure by Letters Patent of the United States is:

1. An alternating current volt ampere response device comprising an alternating current watt meter element having current and voltage energising coils, connections for energising said coils in substantially fixed phase relation from the voltage of an alternating current circuit, a saturable core reactor in series with only one of said coils for varying the current flow in such coil, a saturating winding for such reactor, and connections including rectifier means for energising said saturating winding in proportion to the current flow in said alternating current circuit.

2. Apparatus for measuring the product of the volt and ampere components of an alternating current circuit including an alternating current wattmeter element having two windings, energizing circuits for said windings, said circuits being energized in a substantially fixed phase relation from the circuit to be metered by a voltage proportional to one of said components, only only of said energizing circuits containing a saturable transductor having direct current saturating winding means thereon, and circuit connections including rectifier means for energizing said saturating winding means from the circuit to be metered in proportion to the other of said components.

3. Apparatus for measuring the product of volt and ampere components of a polyphase circuit comprising an alternating current wattmeter element having current and voltage coils, voltage connections between said coils and the polyphase circuit to be metered for energizing said coils in substantially a fixed phase relation, a saturable transductor in series with one only of said coil connections, direct current saturating winding means on said transductor, and polyphase rectifier means connected to energize said saturating winding means by direct current in proportion to the current components of the several phases of such polyphase circuit.

4. Apparatus for measuring the volt amperes of a polyphase alternating current circuit comprising an alternating current wattmeter having a number of wattmeter elements corresponding to the number of phases of the circuit to be metered each of said elements having voltage and current coils, connections for energizing the coils of the different wattmeter elements from corresponding different phase voltages of the circuit to be metered, a saturable transductor in series regulating relation with each of the current coil connections to said wattmeter, each of said transductors having a direct current saturating winding thereon, and connections including rectifier means for supplying direct currents to said saturating windings from such polyphase circuit in proportion to the phase currents thereof, the coils of a given wattmeter element and the saturating winding of the transductor corresponding thereto being supplied respectively from the voltage and current of the same phase of the polyphase circuit.

PHILIP BAXTER.

REFERENCES CITED

The following references are of record in the file of this patent:

UNITED STATES PATENTS

| Number | Name | Date |
|---|---|---|
| 1,808,334 | Angus | June 2, 1931 |
| 1,898,828 | Green | Feb. 21, 1933 |
| 2,228,655 | Downing et al. | Jan. 14, 1941 |
| 2,290,724 | Abbott | July 21, 1942 |
| 2,388,070 | Middle | Oct. 30, 1945 |